United States Patent
Kannan K (10) Patent No.: US 9,172,813 B2
(45) Date of Patent: Oct. 27, 2015

(54) SYSTEMS AND METHODS FOR CALL FORWARDING TO A DEVICE BASED ON A PRIORITY LEVEL AND GEOGRAPHIC PROXIMITY

(71) Applicant: HEWLETT-PACKARD DEVELOPMENT COMPANY, L.P., Fort Collins, CO (US)

(72) Inventor: Ramesh Kannan K, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 40 days.

(21) Appl. No.: 14/353,873

(22) PCT Filed: Sep. 25, 2012

(86) PCT No.: PCT/US2012/056978
§ 371 (c)(1),
(2) Date: Apr. 24, 2014

(87) PCT Pub. No.: WO2013/062703
PCT Pub. Date: May 2, 2013

(65) Prior Publication Data
US 2014/0287732 A1  Sep. 25, 2014

(30) Foreign Application Priority Data
Oct. 28, 2011  (IN) .......................... 3708/CHE/2011

(51) Int. Cl.
H04M 3/42 (2006.01)
H04M 3/54 (2006.01)
H04W 4/16 (2009.01)
H04W 4/02 (2009.01)

(52) U.S. Cl.
CPC ............ *H04M 3/54* (2013.01); *H04M 3/42348* (2013.01); *H04W 4/023* (2013.01); *H04W 4/16* (2013.01)

(58) Field of Classification Search
CPC ... H04M 3/54; H04M 3/42348; H04W 4/023; H04W 4/16
USPC ............................... 455/417, 404.1, 403, 445
See application file for complete search history.

(56) References Cited

U.S. PATENT DOCUMENTS

| | | | | |
|---|---|---|---|---|
| 5,761,312 | A | * | 6/1998 | Zelikovitz et al. ............ 380/257 |
| 6,363,248 | B1 | * | 3/2002 | Silverman ...................... 455/417 |
| 2005/0227666 | A1 | * | 10/2005 | Cheng ......................... 455/404.1 |
| 2009/0005024 | A1 | * | 1/2009 | Kato ............................. 455/417 |

(Continued)

FOREIGN PATENT DOCUMENTS

KR   10-2003-0030621   4/2003

OTHER PUBLICATIONS

International Search Report and the Written Opinion of the International Searching Authority cited in PCT/US2012/056978; mailed Mar. 4, 2013.

*Primary Examiner* — Shahriar Behnamian
(74) *Attorney, Agent, or Firm* — Hewlett-Packard Patent Department (57) ABSTRACT

Systems and methods for call forwarding in a telecommunications network are described herein. A request to update a call forwarding number associated with a subscriber in the telecommunications network is provided. The request includes a phone number of an active mobile device, which is located within geographic proximity to a subscriber mobile device. The active mobile device is associated with a priority level.

15 Claims, 9 Drawing Sheets

(56) References Cited

U.S. PATENT DOCUMENTS

2009/0296913 A1* 12/2009 Thomas et al. .......... 379/211.02
2011/0059732 A1* 3/2011 Cai et al. ...................... 455/417
2011/0165868 A1 7/2011 Jeon et al.
2011/0185868 A1* 8/2011 Schmidt ............................ 83/77

* cited by examiner

SYSTEMS AND METHODS FOR CALL FORWARDING TO A DEVICE BASED ON A PRIORITY LEVEL AND GEOGRAPHIC PROXIMITY

I. BACKGROUND

Service providers offer services to their customers in response to customer orders, change requests and other processes. One particular class of service providers is telecommunications service providers, which provide telecommunication services to their customers, referred to as subscribers. Telecommunications services currently include both wire line and wireless technologies. Examples of wire line telecommunication services include telephone service and related services such as voice mail, call forwarding, three way calling and caller identification, or cable television service and associated cable-provided services, such as Internet access. Examples of wireless telecommunication services include cellular telephone service and associated services such as call forwarding, voice mail and three way calling, wireless electronic mail and paging.

More and more types of services are emerging on various networks. Telecommunication networks in particular are expanding offerings of new services to retain current customers and add new service accounts.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION

One type of service that is provided by telecommunications service providers is call forwarding, which takes all incoming calls to one telephone number and redirects to another telephone number. Call forwarding to voicemail is one instance of a call forwarding service. In a typical communication network, a switch or other device with call control function receives a call attempt to a first phone number. The switch identifies that a call forwarding service is activated for the first phone number (i.e., called party). When activated, the switch may forward the call immediately to another phone number (e.g., voicemail system, another subscriber, etc.), for example for unconditional call forwarding. Alternatively, the switch may attempt to connect the call to the called party, and subsequently forward the call to the other number subject to some conditions, for example, if the call attempt to the called party has not been completed, e.g., called party does not answer the call, line is busy, or there is no answer for the duration of the service providers call timeout period (e.g., four rings). This is otherwise known as conditional call forwarding.

There is not much flexibility with respect to tailoring how call handling, including call forwarding, is applied. Typically, telecommunications service providers enable a static call forwarding facility, where all calls are forwarded to a single phone number, regardless of the location and/or availability of the recipient of the forwarded call.

A service for call forwarding is described herein. The service may be provided by service providers and/or by a mobile device with telephonic capabilities (e.g., mobile phone). In one embodiment, systems and methods for call forwarding in a telecommunications network are provided. A request to update a call forwarding number associated with a subscriber in the telecommunications network is provided to a service provider. The request includes a phone number of an active mobile device, which is located within geographic proximity to a subscriber mobile device. The active mobile device is associated with a priority level. An incoming call is forwarded to the active mobile device using the phone number.

Figure 1:
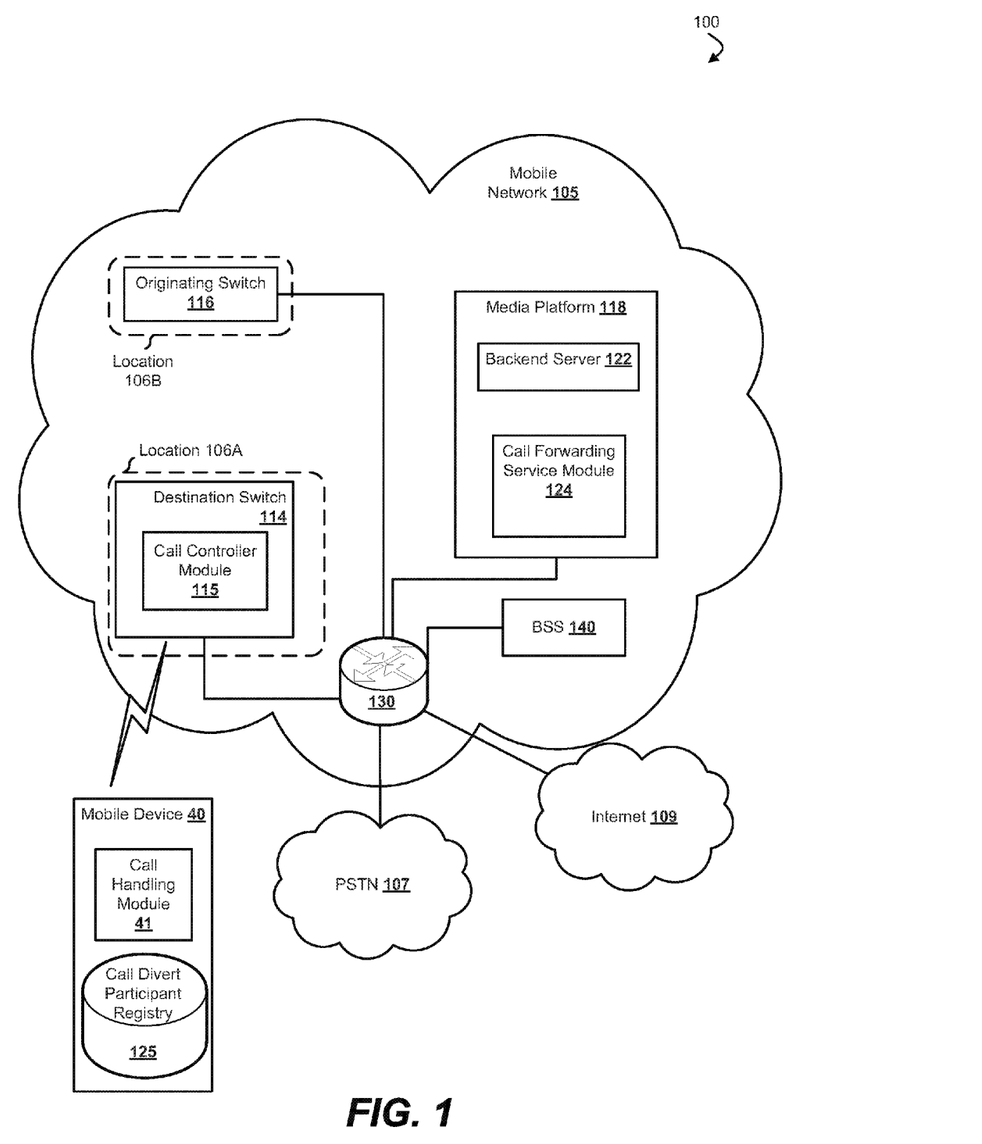
FIG. 1 is a topological block diagram of a telecommunications network in accordance with an embodiment.

FIG. 1 is a topological block diagram of a telecommunications network 100 in accordance with an embodiment. The telecommunications network 100 is described according to the general infrastructure and nomenclature of the Global System for Mobile Communications (GSM) standards although embodiments are not limited to application in such systems, and description thereof is for illustrative purposes. Network 100 includes a mobile network 105, a Public Switched Telephone Network (PSTN) 107, and internet 109.

Mobile network 105 includes an originating switch 116, destination switch 114, a business support system (BSS) 140, a media platform 118, and a router 130, all of which are operatively interconnected and the connection among them may include multiple network segments, transmission technologies and components.

Originating switch 116 is configured to route data from location 106B of mobile network 105 and to manage the communication between mobile devices and PSTN 107. Destination switch 114 is configured to route data, for example to a called party of mobile network 105, and to manage the communication between mobile devices and PSTN 107. In a GSM mobile network, originating switch 116 and destination switch 114 may be Mobile Switching Centers (MSCs). As shown, originating switch 116 and destination switch 114 service different switching system locations in mobile network 105. Originating switch 116 services a location 106B and destination switch 114 services location 106A. In another embodiment, originating switch 116 and destination switch 114 are the same device, for example where a caller using mobile device 40 and a called party are both serviced by the same location, e.g., either location 106A or location 106B.

Mobile computing device 40 is a device with telephonic functionality. Mobile computing device 40 may be a mobile telephone, a personal digital assistant, a handheld computer, or other mobile computing device. Mobile computing device 40 is operatively coupled to mobile network 105, via a base station and a switch, such as destination switch 114, and is configured to exchange electronic messages (e.g. voice and data) and other information with mobile network 105. Moreover, mobile computing device 40 includes a call handling module 41 that is configured to configure a dynamic call divert participant list for a call forwarding service, and to add and delete participants. Call handling module 41 is also configured to manage a call divert participant list stored in a call divert participant registry 125.

Call divert participant registry 125 is a data store configured to store information about participants who have accepted an add request to join a call divert participant list for the call forwarding service. Furthermore, a table in the call divert participant registry 125 correlates participants with priority levels. Call divert participant registry 125 includes a mapping of participant data and a subscriber-selected priority level as a part of the call forwarding service. Specifically, the table may include a device name, priority level, and a phone number of the device.

Media platform 118 is configured to deliver and manage mobile voice and data services. Media platform 118 includes backend server 122, and call forwarding service module 124, both of which are operatively interconnected and the connection among them may include multiple network segments, transmission technologies and components.

Backend server 122 generally is configured to enable services within mobile network 105. Call forwarding service module 124 is configured to enroll a subscriber with a call forwarding service and manage the call forwarding number (i.e., phone number to which a call is diverted). Call forwarding service module 124 is shown as being implemented as a standalone module, but may be implemented on a single server, such as backend server 122 or by multiple servers. Each such server is programmed with machine readable instructions, and may include at least one processor for executing these instructions stored in a machine readable memory.

Call controller module 115 of destination switch 114 is configured to determine whether a called party is enrolled in the call forwarding service, identify a call forwarding number associated with the called party, and execute a call forwarding operation (i.e., conditional call forwarding, unconditional call forwarding).

Router 130 is generally configured to process and transfer data in network 100. Router 130 is an edge device on the edge of a network, such as mobile network 105. As used herein, an edge device is a network switch, router, or other network device on the edge of a network.

Business support systems (BSS) 140 is configured to support various end-to-end services including billing, charging, and settlement. Typically, services are enforced by a charging policy. As such, the call forwarding service is enforced according to a corresponding charging policy. In one embodiment, a subscriber who has enrolled in the call forwarding service may be charged for the cost of network usage. For example, where an incoming call was forwarded by destination switch 114 to another phone number, the cost of airtime usage once the forwarded call was complete may be attributed to the subscriber and may not be charged to the caller's own allocations and/or charges, and/or the forwarding party's charges.

In operation, a telecommunication service provider may offer a call forwarding service for its subscribers. Call divert may be enabled by a device with telephonic capabilities (e.g. mobile device), where a call forwarding phone number may be updated dynamically, instead of remaining fixed until a subscriber manually changes the number.

Configuration of the participant list for call handling may be performed at mobile computing device 40. During configuration, available participants may be added and/or deleted from the participant list. Mobile computing device 40 continuously or periodically ensures an active participant is reachable. As used herein, an active participant is a participant that is recognized by the service provider as being associated with the call forwarding number. If not, a new active participant is selected from the list of participants. When a new active participant is selected, mobile computing device 40 sends a message to the service provider to update the call forwarding number to that of the new active participant. As such, the call forwarding number recognized by the service provider may be updated based on reachability of the participants.

The action of call forwarding by the service provider is triggered by the normal channels. For conditional call forwarding, the triggering condition may be determination of either a missed call (determined by a mobile phone) or an incomplete call (determined by a service provider). As used herein, a missed call is a telephone call that is not answered by its intended recipient prior to the expiration of the call attempt. As used herein, an incomplete call is a telephone call that is not completed if the called party cannot be reached, or is reachable but is busy on another call. For example, a call is typically attempted by the service provider via destination switch 114 for the duration of a service provider's time out period. If the user of the mobile device does not answer the call, destination switch 114 determines that the call was incomplete. This triggers destination switch 114 to forward the call to the forwarding phone number that is recognized by the service provider.

As such, calls may be diverted based on availability of the called party (e.g., unavailable) and the reachability of the active participant. As is further described, reachability, in this context, refers to the geographic proximity of the active participant to the originally called party such that wireless short-range communication between the devices (of the called party and the active participant) is feasible.

For unconditional call forwarding, the triggering condition may be the receipt of an incoming call by destination switch 114, which immediately forwards the call to the forwarding phone number that is recognized by the service provider. As such, calls may be diverted based on the reachability of the active participant.

In either conditional or unconditional call forwarding, the forwarding action itself is fulfilled by the service provider, and more specifically, by destination switch 114. The call handling, which involves updating the service provider with a call forwarding number, is fulfilled by the mobile device, in conjunction with the service provider (which actually performs the update).

Embodiments can also be applied in other network topologies and environments. Telecommunications network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol in the art, and/or any other wireless protocol); and/or any combination of these and/or other networks.

Figure 2:
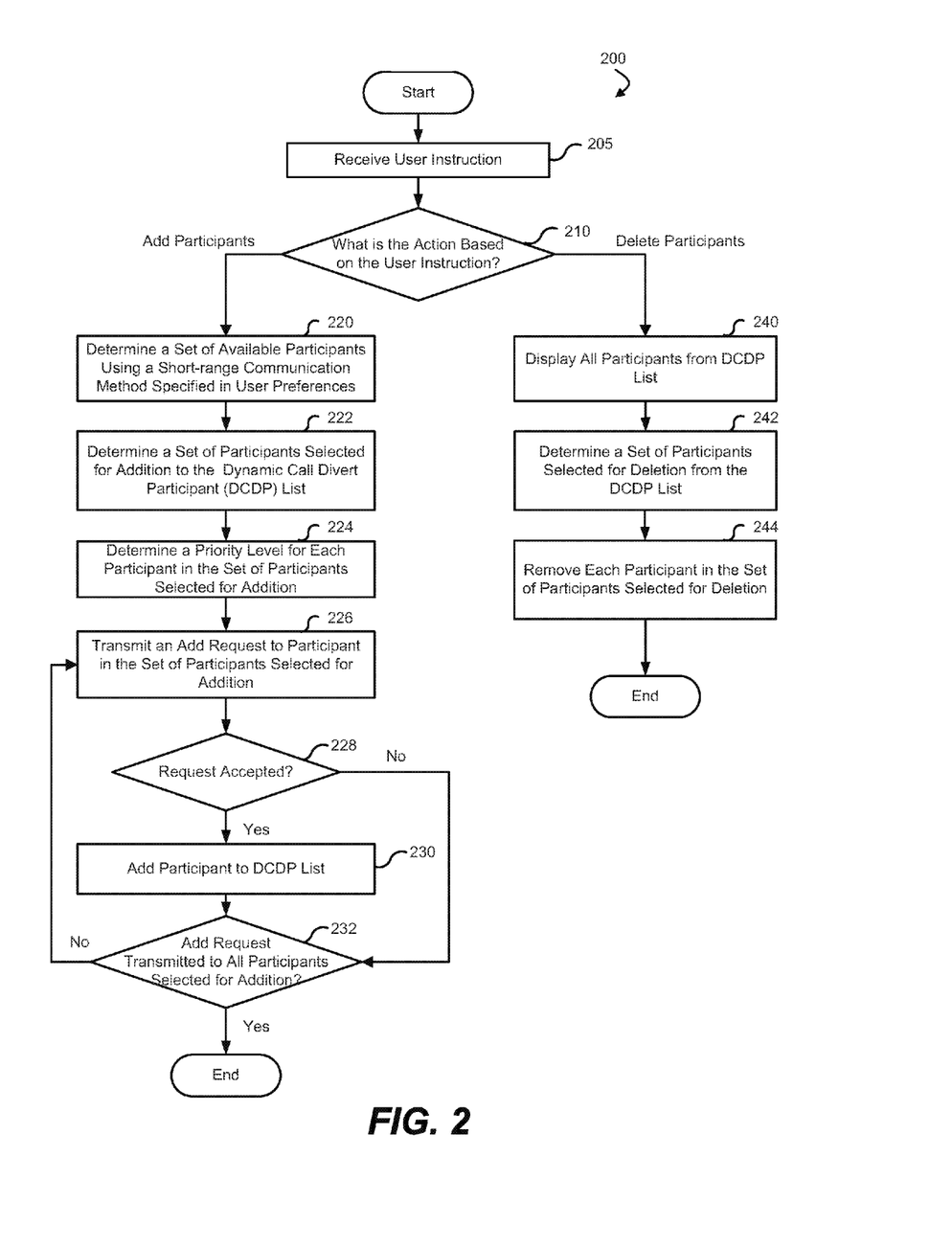
FIG. 2 is a process flow diagram for configuration of a dynamic call divert participant list in accordance with an embodiment.

FIG. 2 is a process flow diagram for configuration of a dynamic call divert participant list in accordance with an embodiment. The depicted process flow 200 may be carried out by execution of sequences of executable instructions. In another embodiment, various portions of the process flow 200 are carried out by components of a mobile device with telephonic functionality and wireless short-range communication capabilities, telecommunication media platform, a switch in a telecommunications network, an arrangement of hardware logic, e.g., an Application-Specific Integrated Circuit (ASIC), etc. For example, blocks of process flow 200 may be performed by execution of sequences of executable instructions in a call handling module of the device.

A call forwarding service for providing customized handling of incoming calls is implemented in a telecommunications network. To initiate call handling, a dynamic call divert participant (DCDP) list is configured. The participant list includes a device name, the associated device contact number (e.g., phone number), and a priority level associated with the device. At step 205, a user of the mobile device provides an instruction using an interface of the mobile device. The user is a subscriber of a service provider of the telecommunications network, and the mobile device is associated with the user's subscription.

At step 210, an action is determined based on the user instruction. Where the instruction is to add participants to the dynamic call divert participant list, processing continues to step 220, where a set of available participants is determined using a wireless short-range communication method as specified in the user's preferences. As used herein, an available participant is a mobile device with telephonic capabilities and is at one point in time within geographic proximity to the subscriber's mobile device (i.e., original call destination) such that wireless short-range communication with the subscriber's mobile device is feasible.

For example, the user may specify the use of Bluetooth™, Wi-Fi™ (e.g., IEEE 802.11), infrared, or any other wireless short-range communication method for communication with other mobile devices within a personal area network (PAN) or wireless PAN (WPAN) of the mobile device. A set of mobile devices is discovered. Each of the discovered devices is treated as an available participant.

At step 222, a set of participants selected for addition to the DCDP list is determined. For example, the subscriber selects from the set of available participants. The selected participants are candidates for addition to the subscriber's dynamic call divert participant list. In one embodiment, this step may be skipped, and all available participants are deemed to be viable candidates.

For each of the participants in the set of selected participants, a priority level is determined, at step 224. The priority level specifies the order in which a participant is determined to be an active participant for the call forwarding service. As used herein, an active participant is a participant that is recognized by the service provider as being the phone number to which calls for the subscriber's mobile device are routed (e.g., the associated call forwarding number). The subscriber might have preferences about which device can receive calls on the subscriber's behalf, for example, based on the ownership of the device. To illustrate, the subscriber may prefer to have his incoming calls routed to the mobile device of his colleague over a mobile device of a stranger.

At step 226, an add request is transmitted to a participant in the set of participants selected for addition. The add request is transmitted via a wireless short-range communication method (e.g., Bluetooth™, Wi-Fi™, infrared, etc.). The specific transmission method used may be specified as a user preference. The add request specifies an identifier, such as the device name, device phone number, or any other identifier associated with the subscriber's mobile device. The identifier in the add request may also include an identifier of the subscriber, e.g., subscriber name. It is determined whether the request was accepted, at step 228. In particular, the mobile device to which the add request was transmitted provides a response which accepts or denies the request. The response specifies an accept or deny indication and a device phone number and/or IP address of the device sending the response.

If not accepted, it is determined whether the add request was transmitted to all participants selected for addition, at step 232. If so, processing ends, otherwise, an add request is sent to the next participant in the set of participants selected for addition, at step 226.

If accepted, the participant is added to the subscriber's DCDP list, at step 230. In particular, the contact number (e.g., phone number) associated with the accepting participant is added to the DCDP list along with the device name and priority level. Processing continues to step 232.

If, at step 210, it is determined the action is a delete participant action, processing continues to step 240, where all participants from the DCDP list are displayed, for example to the subscriber. At step 242, a set of participants selected for deletion from the DCDP list is determined. For example, the subscriber selects from the participants in the DCDP list. The selected participants are those that the subscriber flags for deletion from the DCDP list. At step 244, each participant that was selected for deletion is removed from the subscriber's DCDP list.

As such, the subscriber is able to edit the DCDP list by controlling additions and deletions, and thereby controlling the devices that can potentially receive the forwarded calls.

Figure 3:
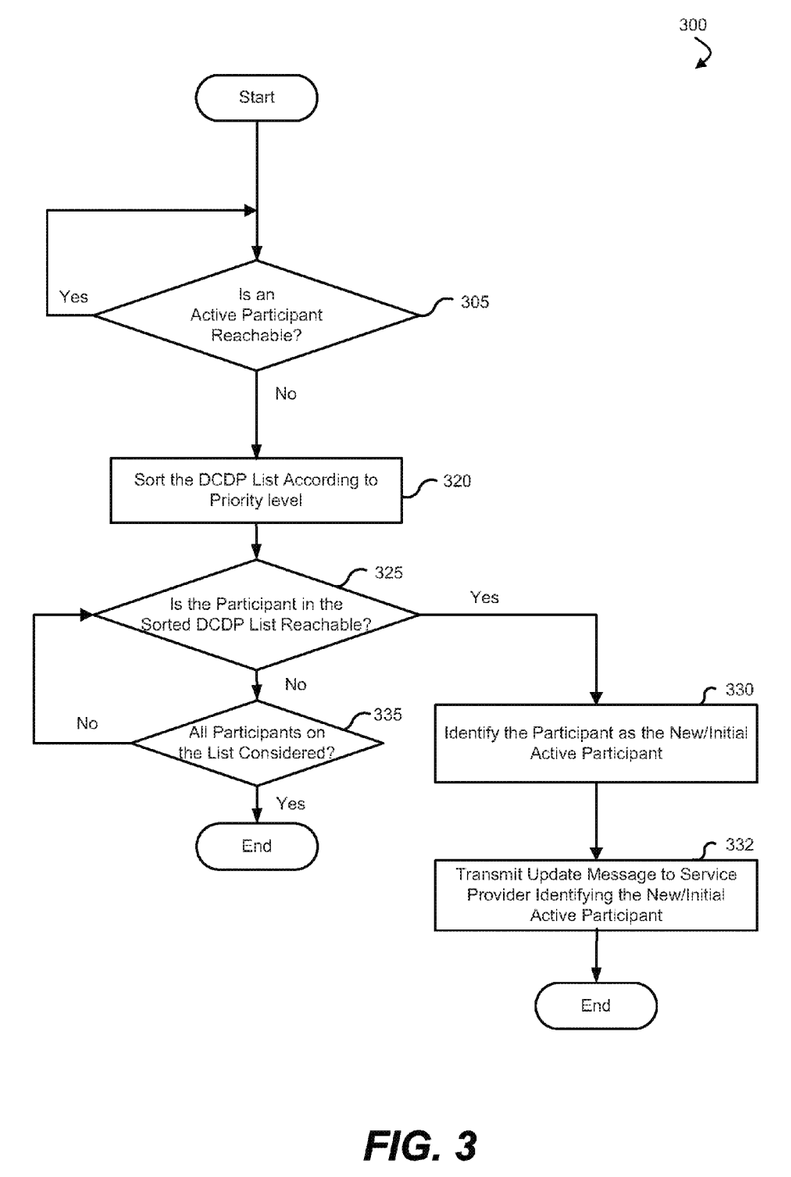
FIG. 3 is a process flow diagram for updating a service provider with an active participant for a call forwarding service in accordance with an embodiment.

FIG. 3 is a process flow diagram for updating a service provider with an active participant for a call forwarding service in accordance with an embodiment. The depicted process flow 300 may be carried out by execution of sequences of executable instructions. In another embodiment, various portions of the process flow 300 are carried out by components of a mobile device with telephonic functionality and wireless short-range communication capabilities, telecommunication media platform, a switch in a telecommunications network, an arrangement of hardware logic, e.g., an Application-Specific Integrated Circuit (ASIC), etc. For example, blocks of process flow 300 may be performed by execution of sequences of executable instructions in a call handling module of the mobile device.

A call forwarding service for providing customized handling of incoming calls is implemented in a telecommunications network. After configuration of a dynamic call divert participant (DCDP) list, an active participant is selected, for example from the list. As previously described, an active participant is a participant that is recognized by the service provider as being the call forwarding number.

At step 305, it is determined whether an active participant is reachable. As used herein, reachability refers to whether the mobile device that is the active participant is currently within geographic proximity to the subscriber's mobile device such that wireless short-range communication with the subscriber's mobile device is feasible. The specific wireless short-range communication method used may be specified as a user preference. This check is done to ensure the active participant is still nearby the subscriber's mobile device.

The reachability of the active participant is checked periodically. Where the active participant is determined to be reachable at step 305, it is again checked for reachability after a configurable and defined duration.

Where the active participant is not reachable or no longer reachable, a new active participant is selected. In another embodiment, if no active participant is initially recognized, an active participant is selected. The selection begins by sorting the DCDP list according to the priority level associated with each participant on the list, at step 320. Various methods of sorting by priority may be implemented.

Starting from the highest level of priority, it is determined at step 325 whether the participant in the sorted DCDP list is currently reachable. If so, that participant is identified as the active participant (i.e., either initial active participant or new active participant) at step 330. An update message is transmitted to a service provider at step 332. The update message includes the phone number of the active participant identified at step 330. As will be further described in FIG. 6A, the service provider updates its records such that the phone number in the update message is recognized as the number to which calls originally destined for the subscriber's mobile device are diverted (e.g., call forwarding number).

If the outcome at step 325 indicates that the participant is not reachable, it is determined whether all participants on the subscribers DCDP list have been considered, at step 335. If not, the next participant, moving from highest to lowest priority level, on the sorted list is considered with respect to reachability, at step 325. The reachability through the list is considered recursively until, for example, one of the participants is reachable or all participants on the list have been considered. Where none of the participants on the sorted list are found to be reachable, the last active participant remains the same.

As such, where the active participant is in proximity to the mobile device, the reachability of the subscriber is extended, even if the called party's mobile device is not reachable at the time an incoming call arrives. For example, an emergency call may be forwarded to the active participant, the user of which may easily notify the called party since the active participant and called party are in close geographic proximity to each other. Furthermore, the user of the active participant device can handle the forwarded calls, for example, if the called party is busy or otherwise unable to take the incoming call.

Figure 4:
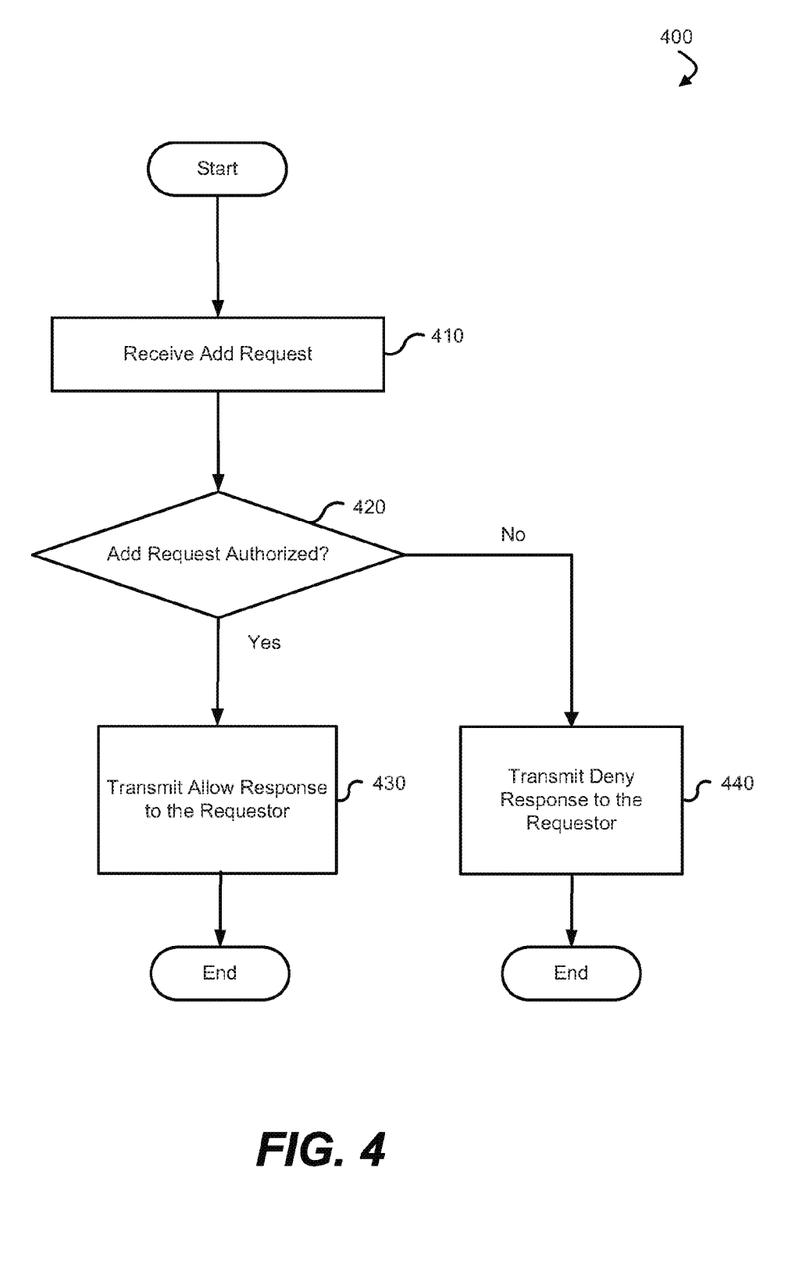
FIG. 4 is a process flow diagram for authorizing a request to add a participant to a dynamic call divert participant list in accordance with an embodiment.

FIG. 4 is a process flow diagram for authorizing a request to add a participant to a dynamic call divert participant list in accordance with an embodiment. The depicted process flow 400 may be carried out by execution of sequences of executable instructions. In another embodiment, various portions of the process flow 400 are carried out by components of a mobile device with telephonic functionality and wireless short-range communication capabilities, telecommunication media platform, a switch in a telecommunications network, an arrangement of hardware logic, e.g., an Application-Specific Integrated Circuit (ASIC), etc. For example, blocks of process flow 400 may be performed by execution of sequences of executable instructions in an available participant mobile device.

During the process of configuration of a dynamic call divert participant (DCDP) list, which is stored in the subscriber's mobile device, selected participants are invited to be added to the DCDP list. At step 410, an add request is received, for example by the available participant mobile device. The add request may be received via wireless short-range communication. The specific wireless short-range communication method used may be specified as a preference of the requestor (e.g., subscriber's mobile device).

At step 420, it is determined whether the add request is authorized. Authorization enables the user of the participant mobile device to knowingly accept forwarded calls on behalf of the subscriber. In one embodiment, the user is presented with an option to provide authorization for the add request. The add request may be either accepted or denied. In another embodiment, the request may be conditionally accepted.

Where the add request is authorized, at step 430, an allow response is transmitted to the requestor (e.g., subscriber's mobile device). The allow response specifies an acceptance of the invitation to be added to the requestor's DCDP list. The response also includes the participant mobile device phone number and/or IP address. The allow response may be sent via a wireless short-range communication method, for example as specified by a preference of the requestor.

Where the add request is not authorized, at step 440, a deny response is transmitted to the requestor (e.g., subscriber's mobile device). The deny response specifies denial of the add request. The response may also include the participant mobile device phone number and/or IP address. The deny response may be sent via a wireless short-range communication method, for example as specified by a preference of the requestor.

Figure 5:
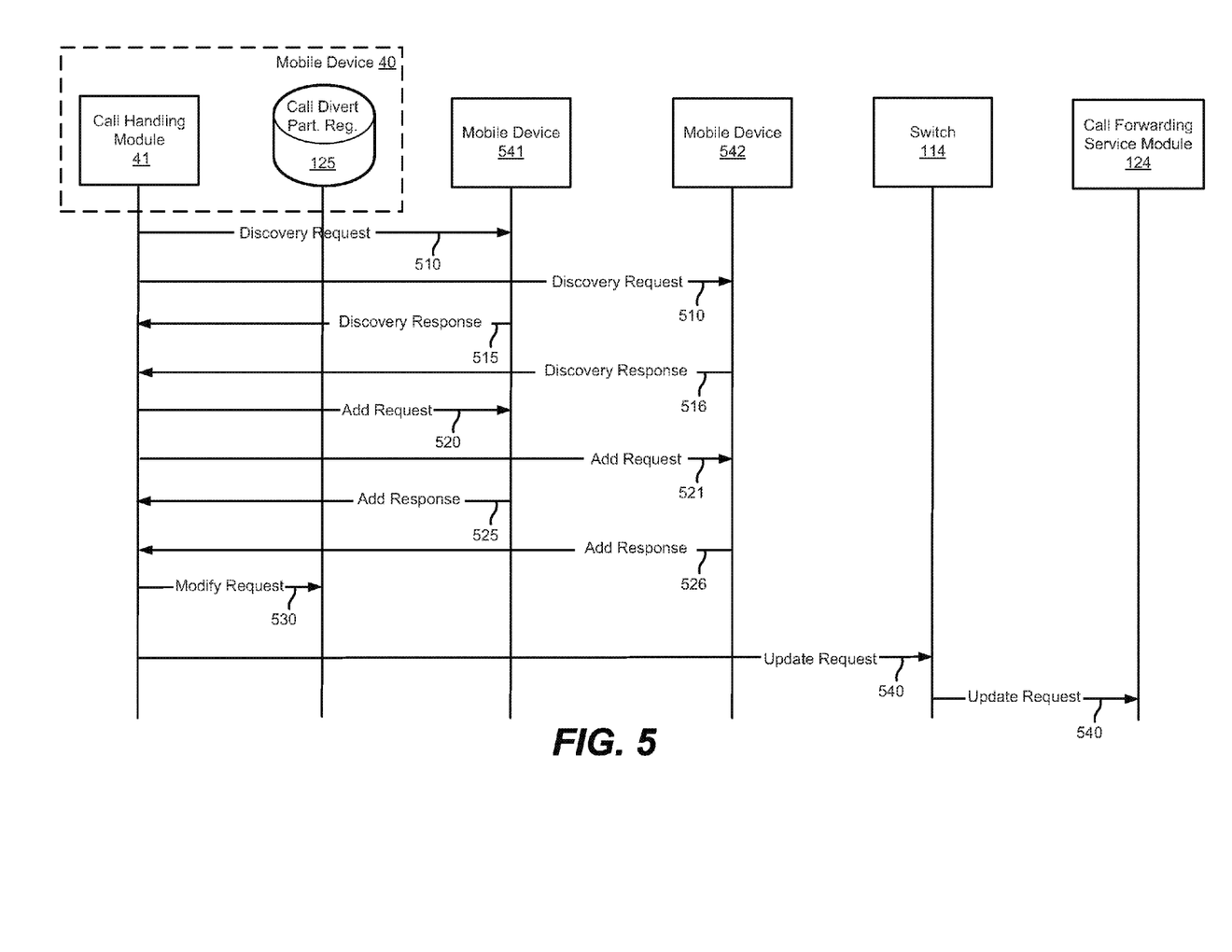
FIG. 5 is a message flow diagram for adding a participant to a dynamic call divert participant list in accordance with an embodiment.

FIG. 5 is a message flow diagram for adding a participant to a dynamic call divert participant list in accordance with an embodiment. In this example, a subscriber employs a mobile device 40 to initiate the configuration of a dynamic call divert participant list for the call forwarding service. The call handling module 41 of mobile device 40 determines a set of available participants by sending discovery requests 510 to mobile device 541 and 542, via a wireless short-range communication protocol, such as Bluetooth™. Discovery response 515 is sent from mobile device 541 to mobile device 40. Likewise a discovery response 516 is sent from mobile device 542 to mobile device 40. Upon receipt of the discovery responses 515 and 516, mobile device 40 determines that mobile devices 541 and 542 are both available participants. In other words, mobile devices 541 and 542 are in geographic proximity to mobile device 40.

Call handling module 41 determines which of the available participants are selected for addition to a DCDP list of mobile device 40, and of the selected participants, a corresponding priority rank.

Mobile device 40 sends an add request 520 to mobile device 541 and an add request 521 to mobile device 542, both of which are available participants selected for addition to the DCDP list, which is stored in call divert participant registry 125.

An add response 525 is sent from mobile device 541 to mobile device 40. Likewise, an add response 526 is sent from mobile device 542 to mobile device 40. In one embodiment, add response 525 is a denial of the add request, and as such mobile device 541 is not added to the DCDP list.

On the other hand, add response 526 is an allowance of the add request. As such, mobile device 542 is added to the DCDP list via a modify request 530. Specifically, the modify request 530 is sent from call handling module 41 to call divert participant registry 125. The modify request includes a device name, device ID (e.g., phone number), and an associated priority rank of mobile device 542.

Call handling module 41 determines that mobile device 542 is the highest priority participant on the DCDP list and is reachable, and identifies mobile device 542 as an active participant. Mobile device 40 sends an update request 540 to the service provider via switch 114. The switch 114 forwards update request 540 to the service provider's call forwarding service module 124. The update request includes the phone number of mobile device 542. As such, calls that are originally directed to mobile device 40 may be forwarded to mobile device 542.

Figure 6A:
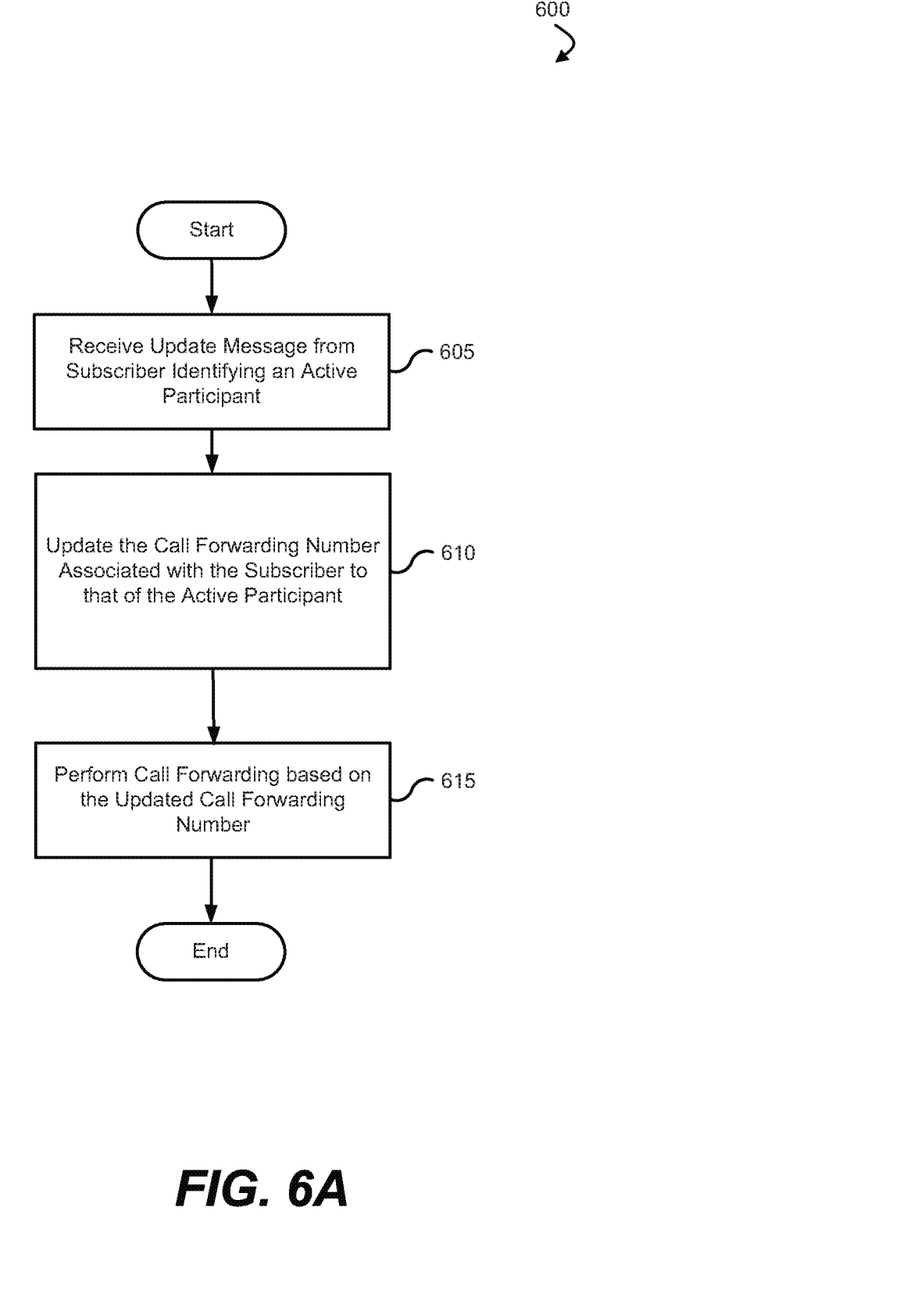
FIG. 6A is a process flow diagram for updating a call forwarding number with an active participant for a call forwarding service in accordance with an embodiment.

FIG. 6A is a process flow diagram for updating a call forwarding number with an active participant for a call forwarding service in accordance with an embodiment. The depicted process flow 600 may be carried out by execution of sequences of executable instructions. In another embodiment, various portions of the process flow 600 are carried out by components of a media platform of a telecommunications service provider, a switch in a telecommunications network, an arrangement of hardware logic, e.g., an Application-Specific Integrated Circuit (ASIC), etc. For example, blocks of process flow 600 may be performed by execution of sequences of executable instructions in a forwarding service module of the media platform and/or a call controller module of the switch.

A call forwarding service for providing dynamic forwarding of incoming calls is implemented in a telecommunications network. At step 605, an update message is received, for example from a subscriber's mobile device. The update message indicates a phone number of a mobile device that was identified by the subscriber's mobile device as an active participant.

At step 610, a call forwarding number associated with the subscriber is updated to the phone number of the active participant, as specified in the update message. Upon completion of this update, the service provider recognizes the mobile device associated with the phone number as the active participant with respect to the call forwarding service.

Call forwarding may then be performed based on the updated call forwarding number, at step 615. In one embodiment, the actual call forwarding action is performed by a switch, which is local to the subscriber's mobile device, in the service provider's network.

For purposes of explanation, the subscriber may be travelling with a group of friends in a vehicle. The subscriber may be the driver, and thus the mobile device of the subscriber may not be answerable due to an unavailable status of the subscriber. Calls may be diverted to a mobile device of a friend in the vehicle, and as such, the subscriber does not miss a call. In another scenario, the subscriber's mobile device is off, for example due to a lack of battery power. Calls to the subscriber may be routed to a nearby colleague.

As such, incoming calls originally destined for the subscriber's mobile device may be diverted to the call forwarding number based on the reachability of the call forwarding device. Furthermore, calls may be conditionally diverted, for example based on the availability of the called party, i.e., subscriber's mobile device.

Figure 6B:
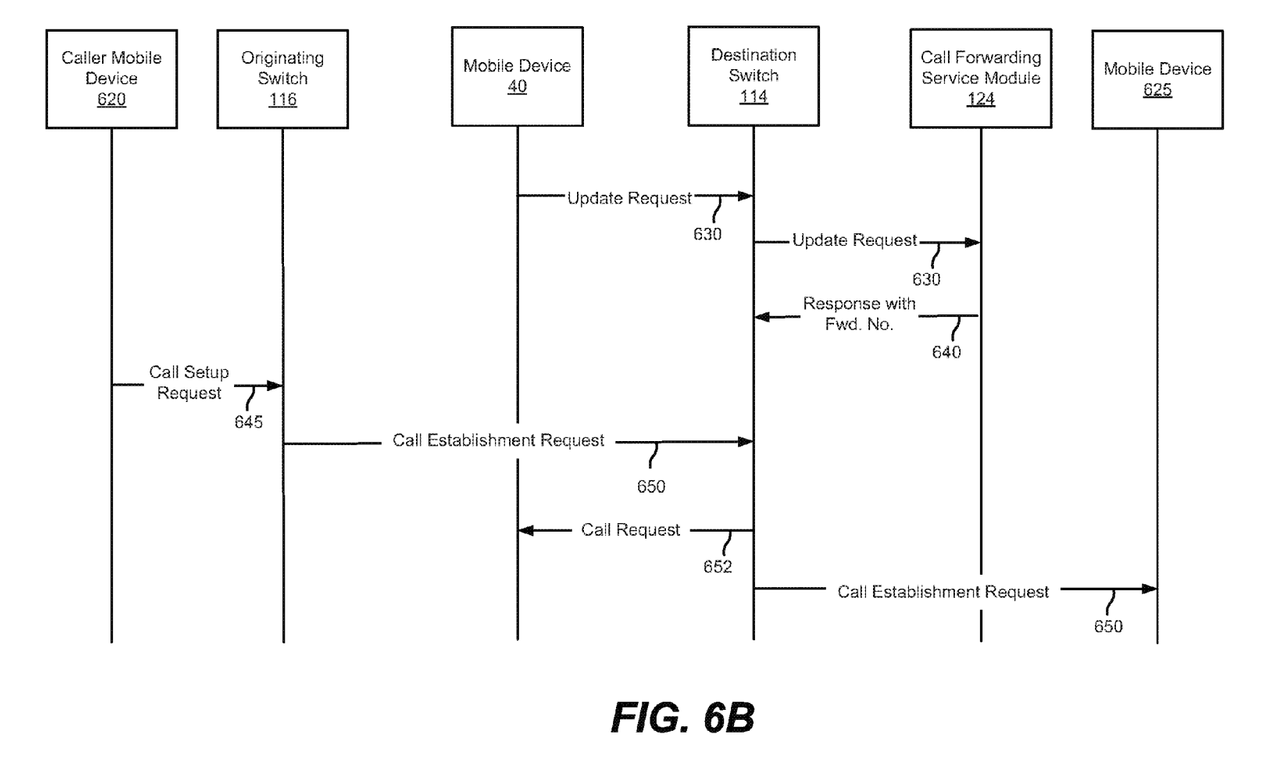
FIG. 6B is a message flow diagram for call forwarding by a service provider using an updated call forwarding number in accordance with an embodiment.

FIG. 6B is a message flow diagram for call forwarding by a service provider using an updated call forwarding number in accordance with an embodiment. In this example, a subscriber employs mobile device 40 to initiate the update of a call forwarding number. Mobile device 40 sends an update request 630 to the service provider via switch 114. The switch 114 forwards update request 630 to the service provider's call forwarding service module 124. The update request 630 identifies mobile device 625 as an active participant. In other words, mobile device 624 is identified as the call forwarding device, i.e., the device to which calls are diverted.

Call forwarding service module 124 may update the call forwarding number associated with mobile device 40 with the phone number of the active participant. A response message 640 may be sent by the call forwarding service module 124 of the service provider's media platform to switch 114. The response message 640 includes the updated call forwarding number.

A caller, using mobile device 620, initiates a call to mobile device 40, which previously initiated the update of a call forwarding number. The call is initiated when the user of mobile device 620 dials the phone number of the subscriber's mobile device 40. The mobile device 620 sends a call setup request message 645 to the mobile telecommunications network via a base station and an originating switch 116.

The call setup request message 645 is handled by originating switch 116, which checks whether the incoming call is allowed by referencing a subscriber record in a location register (e.g., Home Location Register, Visiting Location Register) of the service provider.

If allowed, originating switch 116 forwards a call establishment request 650 to destination switch 114. Upon receiving the call establishment request 650, destination switch 114 identifies that the call forwarding service is activated for the dialed phone number (e.g., called party), which is mobile device 40.

Destination switch 114 determines conditions associated with the call forwarding service for the subscriber. A condition may include performing call forwarding upon determining the call has not been completed, e.g., called party does not answer the call.

Destination switch 114 attempts to connect the call by sending a call request 652 to mobile device 40. When the condition has been satisfied, destination switch 114 diverts the call to the updated call forwarding number, i.e., mobile device 625. Specifically, destination switch 114 sends the call establishment request 650 to mobile device 625.

Figure 7:
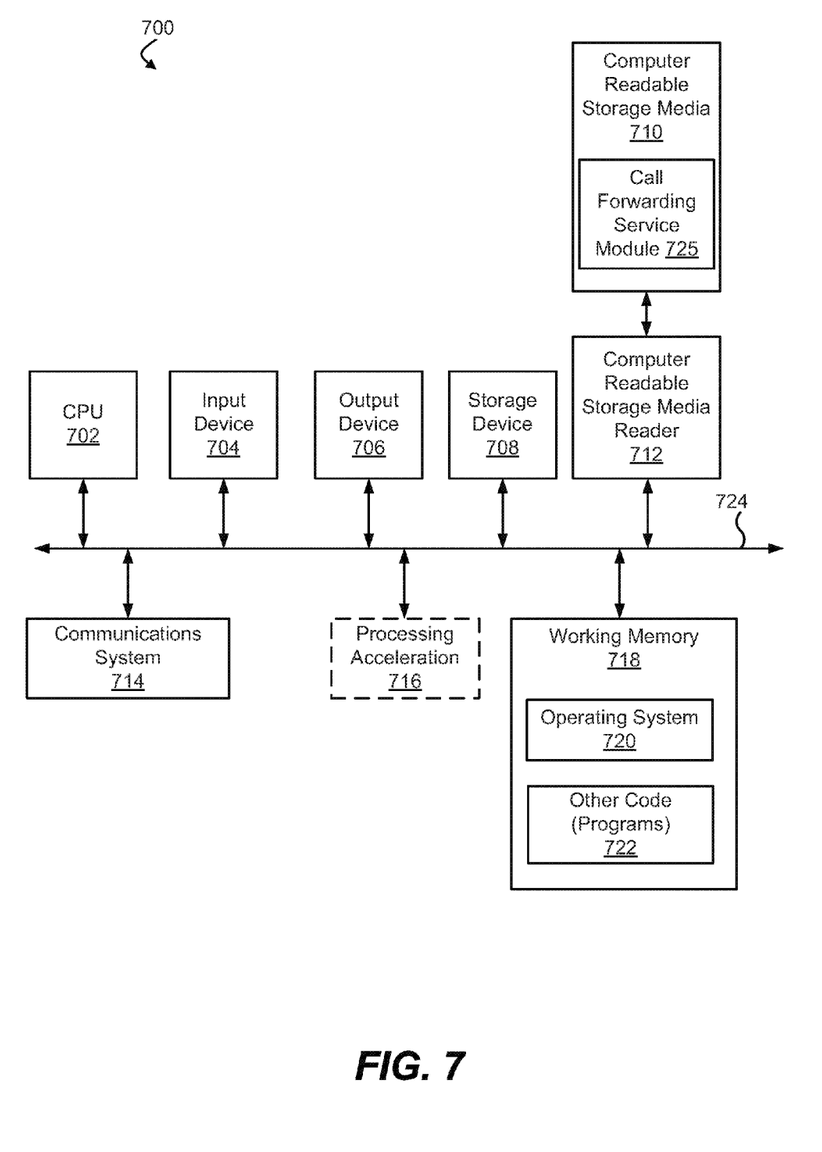
FIG. 7 illustrates a computer system in which an embodiment may be implemented.

FIG. 7 illustrates a computer system in which an embodiment may be implemented. The system 700 may be used to implement any of the computer systems described above. The computer system 700 is shown comprising hardware elements that may be electrically coupled via a bus 724. The hardware elements may include at least one central processing unit (CPU) 702, at least one input device 704, and at least one output device 706. The computer system 700 may also include at least one storage device 708. By way of example, the storage device 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor (DSP), a special-purpose processor, and/or the like.

The computer-readable storage media reader 712 can further be connected to a computer-readable storage medium 710, together (and in combination with storage device 708 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 710 may be non-transitory such as hardware storage devices (e.g., RAM, ROM, EPROM (erasable programmable ROM), EEPROM (electrically erasable programmable ROM), hard drives, and flash memory). The communications system 714 may permit data to be exchanged with the network and/or any other computer described above with respect to the system 700. Computer-readable storage medium 710 includes a call forwarding service module 725, which may be a call controller module or a call forwarding service module.

The computer system 700 may also comprise software elements, which are machine readable instructions, shown as being currently located within a working memory 718, including an operating system 720 and/or other code 722, such as an application program (which may be a client application, Web browser, mid-tier application, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Figure 8:
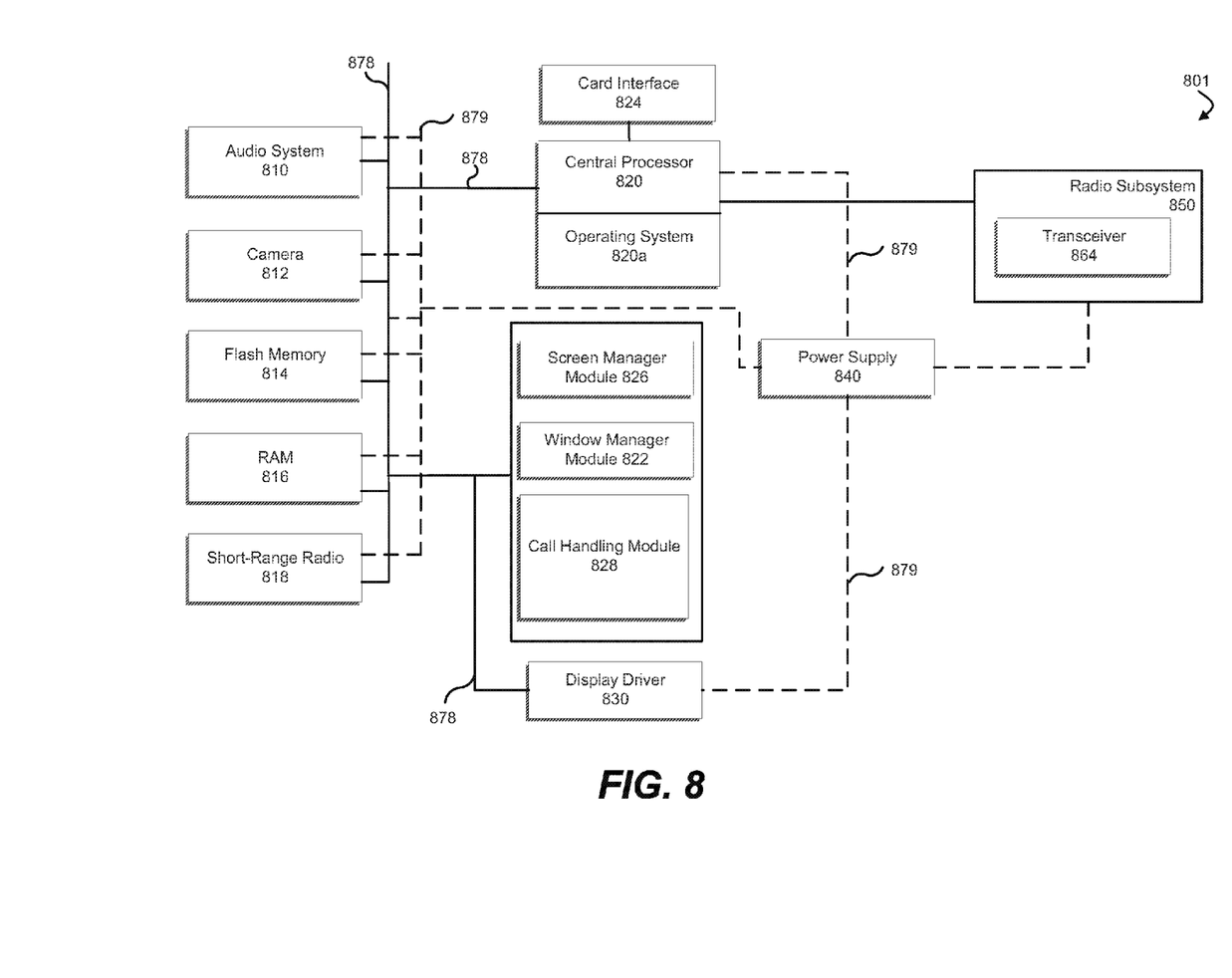
FIG. 8 is a block diagram of architecture of a mobile computing device in accordance with an embodiment.

FIG. 8 is a block diagram of an architecture of a mobile computing device 801, which is shown as, but not limited to, a device with telephonic functionality, in accordance with an embodiment. Mobile computing device 801 may be a mobile telephone, a personal digital assistant, a handheld computer, or other mobile computing device.

Mobile computing device 801 includes a central processor 820, a power supply 840, and a radio subsystem 850.

The central processor 820 is configured for operation with a computer operating system 820*a*. The operating system is an interface between hardware and an application, with which a user typically interfaces. The operating system is responsible for the management and coordination of activities and the sharing of resources of the mobile computing device 801. The operating system provides a host environment for applications that are run on the mobile computing device 801. As a host, one of the purposes of an operating system is to handle the details of the operation of the mobile computing device 801. Examples of an operating system ("OS") include PALM OS and PALM WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and PHONE OS), GOOGLE OS (CHROME or ANDROID), and LINUX.

The central processor 820 communicates with an audio system 810, camera 812, flash memory 814, RAM 816, a short range radio module 818 (e.g., Bluetooth™, and Wi-Fi™ component (e.g., IEEE 802.11)). The central processor 820 communicatively couples these various components or modules through a data line (or bus) 878. The power supply 840 powers central processor 820, radio subsystem 850 and a display driver 830 (which may be contact or inductive-sensitive). The power supply 840 may correspond to a direct current source (e.g., a battery pack, including rechargeable) or an alternating current (AC) source. The power supply 840 powers the various components through a power line (or bus) 879.

The central processor 820 communicates with applications executing within mobile computing device 801 through the operating system 820*a*. In addition, intermediary components, for example, a window manager module 822 and a screen manager module 826, provide additional communication channels between the central processor 820 and operating system 820 and system components, for example, the display driver 830.

In one embodiment, the window manager 822 comprises a software or firmware module that includes instructions that initialize a virtual display space stored in the RAM 816 and/or the flash memory 814. In another embodiment, a call divert participant registry is stored in the flash memory 814. The screen manager 826 comprises a software or firmware module that includes instructions that manages content displayed on a screen of mobile computing device 801.

A call handling module 828 comprises software that includes machine readable instructions that are, for example, integrated with the operating system or configured to be an application operational with the operating system. In some embodiments call handling module 828 may comprise firmware, for example, stored in the flash memory 814. The call handling module 828 is configured to configure a participant list for a call handling service. The call handling module 828 is further configured to determine an active participant and update a service provider identifying the active participant.

It is noted that call handling module 828 is configured to interface with applications, such as, but not limited to, contact lists, calendars, task lists, notepads, calculator applications, spreadsheets, games, ringtone settings, and a phone application or messaging application. In turn, these applications may interface with the radio subsystem, for example, to receive incoming telephone calls, incoming short message service (SMS), and electronic mail messages.

In one embodiment, central processor 820 executes logic (e.g., by way of programming, code, or instructions) corresponding to executing applications. It is noted that numerous other components and variations are possible to the hardware architecture of the mobile computing device 801, thus an embodiment such as shown by FIG. 8 is illustrative of one implementation for an embodiment.

Radio subsystem 850 includes a transceiver 864. Transceiver 864 may be two separate components for transmitting and receiving signals or a single component for both transmitting and receiving signals. In either instance, it is referenced as transceiver 864. The receiver portion of the transceiver 864 communicatively couples with a radio signal input of device 801, e.g., an antenna, where communication signals are received from an established call (e.g., a connected or on-going call). The received communication signals include voice (or other sound signals) received from the call and processed by the radio processor 860. The transmitter portion of the transceiver 864 communicatively couples a radio signal output of device 801, e.g., the antenna, where communication signals are transmitted to an established (e.g., a connected or active) call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 850, the basic components shown provide the ability for the mobile computing device to perform radio-frequency communications, including telephonic communications. A radio processor may communicate with central processor 820 using the data line (or bus) 878.

The card interface 824 is adapted to communicate, wirelessly or wired, with external accessories (or peripherals), for example, media cards inserted into the expansion slot (not shown). The card interface 824 transmits data and/or instructions between central processor 820 and an accessory, e.g., an expansion card or media card, coupled within the expansion slot. The card interface 824 also transmits control signals from central processor 820 to the expansion slot to configure the accessory. It is noted that the card interface 824 is described with respect to an expansion card or media card; it also may be structurally configured to couple with other types of devices external to device 801, for example, an inductive charging station for the power supply 840 or a printing device.

The specification and drawings are, accordingly, to be regarded in an illustrative rather than a restrictive sense. It will, however, be evident that various modifications and changes may be made.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for call forwarding in a telecommunications network, the method comprising:
   receiving, by a service provider of the telecommunications network, a request to update a call forwarding number associated with a subscriber in the telecommunications network, wherein the request includes a phone number of an active mobile device, wherein the active mobile device is associated with a priority level and wherein the active mobile device is located within geographic proximity to a subscriber mobile device;
   replacing a previous call forwarding number with the phone number of the active mobile device;
   receiving an incoming call for the subscriber; and
   forwarding the incoming call to the active mobile device using the phone number.

2. The method of claim 1, further comprising:
   determining a plurality of mobile devices within a wireless personal area network of the subscriber mobile device;
   determining a set of mobile devices of the plurality of mobile devices selected for addition to a list;
   transmitting an add request to each mobile device of the set of mobile devices;
   adding to the list a device identifier for each mobile device of the set of mobile devices that accepts the add request; and
   identifying the active mobile device using the list.

3. The method of claim 2, further comprising:
   determining a priority level for each mobile device in the set of mobile devices; and
   sorting the list by priority level of each mobile device in the list; wherein identifying the active mobile device comprises:
      selecting a mobile device with the highest priority level; and
      determining whether the selected mobile device is located within a geographic proximity to a subscriber mobile device.

4. The method of claim 2, wherein the list includes a mapping of a mobile device name, mobile device phone number, and priority level, for each entry in the list.

5. The method of claim 2, wherein the plurality of mobile devices within a wireless personal area network of the subscriber mobile device are determined using a wireless short-range communication protocol.

6. The method of claim 5, wherein the wireless short-range communication protocol is specified by the subscriber.

7. The method of claim 2, wherein the add request is transmitted using a wireless short-range communication protocol that is specified by the subscriber.

8. The method of claim 2, further comprising:
   determining set of mobile devices of a plurality of mobile devices on the list selected for deletion; and
   removing from the list the set of mobile devices selected for deletion.

9. The method of claim 1, wherein forwarding the incoming call further comprises:
   determining the incoming call was not answered by the subscriber mobile device.

10. A mobile device comprising:
    a short-range radio module for communicating directly with other mobile devices located within a geographic proximity to the mobile device;
    a radio subsystem for communicating with other mobile devices via a media platform of a telecommunications service provider; and
    a call handler for generating a request to update a call forwarding number associated with a subscriber in the telecommunications network, wherein the request includes a phone number of an active mobile device, wherein the active mobile device is associated with a priority level, and wherein the active mobile device is located within geographic proximity to a subscriber mobile device.

11. The mobile device of claim 10, wherein the call handler
    determines a plurality of mobile devices within a wireless personal area network of the subscriber mobile device;
    determines a set of mobile devices of the plurality of mobile devices selected for addition to a list;
    transmits an add request to each mobile device of the set of mobile devices;
    adds to the list a device identifier for each mobile device of the set of mobile devices that accepts the add request; and
    identifies the active mobile device using the list.

12. The mobile device of claim 11, wherein the call handler
    determines a priority level for each mobile device in the set of mobile devices; and
    sorts the list by priority level of each mobile device in the list.

13. A non-transitory computer-readable medium storing a plurality of instructions to control a data processor, the plurality of instructions comprising instructions that cause the data processor to:
    receive a request to update a call forwarding number associated with a subscriber in a telecommunications network, wherein the request includes a phone number of an active mobile device, wherein the active mobile device is associated with a priority level and wherein the active mobile device is located within geographic proximity to a subscriber mobile device;
    replace a previous call forwarding number with the phone number of the active mobile device;
    receive a request for a communication connection with the subscriber; and
    forward the request for the communication connection to the active mobile device using the phone number.

14. The non-transitory computer-readable medium of claim 13, wherein the active mobile device is a mobile device in a set of mobile devices located within geographic proximity to a subscriber mobile device.

15. The non-transitory computer-readable medium of claim 13, wherein the instructions that cause the data processor to forward the request for the communication connection comprise instructions that cause the data processor to:
   determine the request for the communication connection was not answered by the subscriber mobile device.

* * * * *